United States Patent [19]
Gohda et al.

[11] Patent Number: 5,347,408
[45] Date of Patent: Sep. 13, 1994

[54] MAGNETIC RECORDING AND REPRODUCING METHOD AND APPARATUS WITH VERTICAL MAGNETIZATION COMPONENT REDUCTION

[75] Inventors: Makoto Gohda, Tokyo; Shinichi Yamashita, Kanagawa; Yasuyuki Tanaka, Tokyo, all of Japan

[73] Assignee: Canon Kabushiki Kaisha, Tokyo, Japan

[21] Appl. No.: 828,137

[22] Filed: Jan. 30, 1992

[30] Foreign Application Priority Data

Feb. 7, 1991 [JP] Japan ................. 3-016469

[51] Int. Cl.$^5$ ............. G11B 5/035; B05D 5/12; C23C 16/00; H01F 1/00
[52] U.S. Cl. .................. 360/65; 427/127; 427/250; 428/611; 428/928
[58] Field of Search .......... 428/668, 336, 141, 611, 428/928, 555; 427/431, 131; 360/120, 127, 65, 39, 10.2, 27, 29, 32, 33.1, 40, 46, 64, 125, 126, 129, 4

[56] References Cited

U.S. PATENT DOCUMENTS

| | | | |
|---|---|---|---|
| 4,234,898 | 11/1980 | Nakagawa et al. | 360/41 |
| 4,371,590 | 2/1983 | Izumi et al. | 428/555 |
| 4,520,076 | 5/1985 | Saito et al. | 428/611 |
| 5,069,967 | 12/1991 | Yokoyama et al. | 428/336 |

Primary Examiner—Donald Hajec
Assistant Examiner—Patrick Wamxoy
Attorney, Agent, or Firm—Robin, Blecker, Daley & Driscoll

[57] ABSTRACT

A digital signal to be recorded is converted into a digital signal having a suppressed low-frequency spectrum and having a shortest recording wavelength greater than half an original shortest recording wavelength, and the converted digital signal is recorded on a magnetic recording medium in which a plurality of metal evaporated films having different crystal-growth directions are laminated. The digital signal is reproduced from the magnetic recording medium in which the plurality of metal evaporated films having different crystal-growth directions are laminated. Waveform equalization is performed on the reproduced digital signal, and integration detection is performed on the waveform-equalized digital signal, thereby restoring an original digital signal.

10 Claims, 7 Drawing Sheets

DIRECTION OF HEAD SCAN 20 → MAGNETIC LAYER 21

BASE FILM 22

FIG.5(a) (PRIOR ART) e

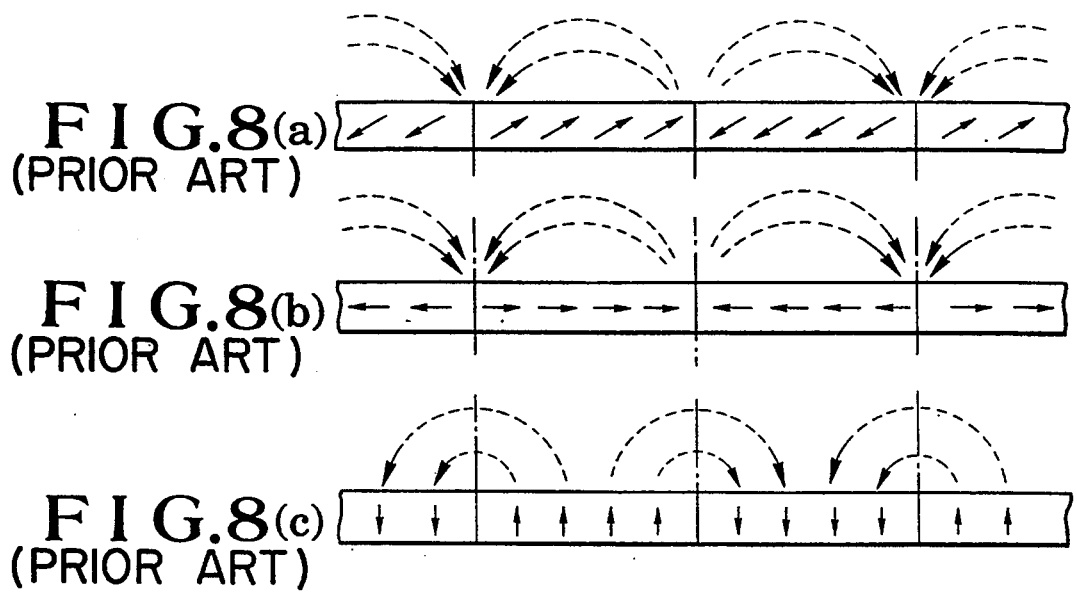
F I G. 8(a) (PRIOR ART)
F I G. 8(b) (PRIOR ART)
F I G. 8(c) (PRIOR ART)
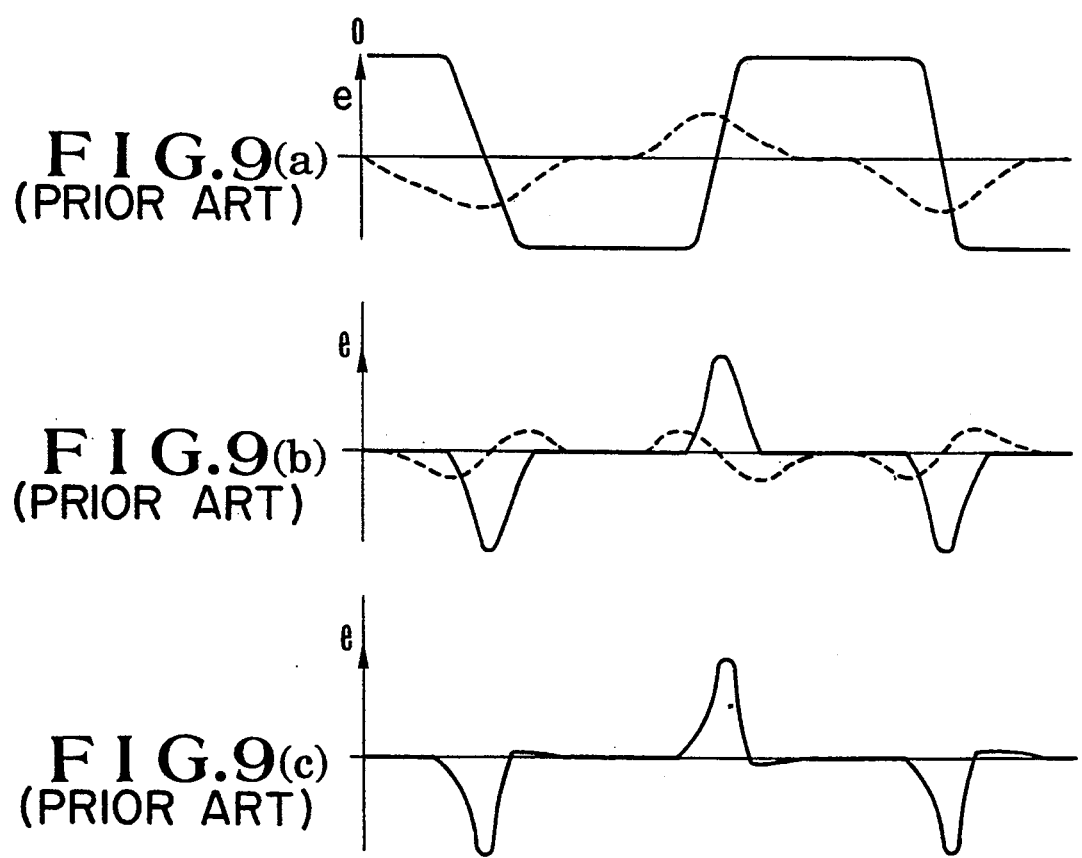
F I G. 9(a) (PRIOR ART)
F I G. 9(b) (PRIOR ART)
F I G. 9(c) (PRIOR ART)

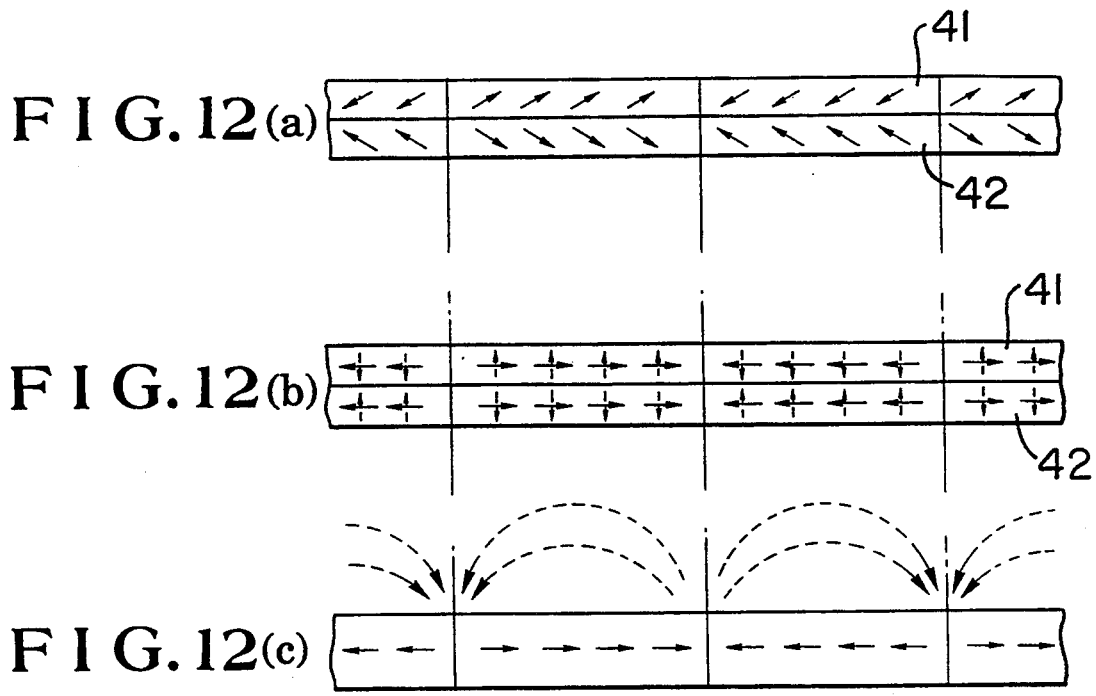
FIG. 12(a)
FIG. 12(b)
FIG. 12(c)
FIG. 13
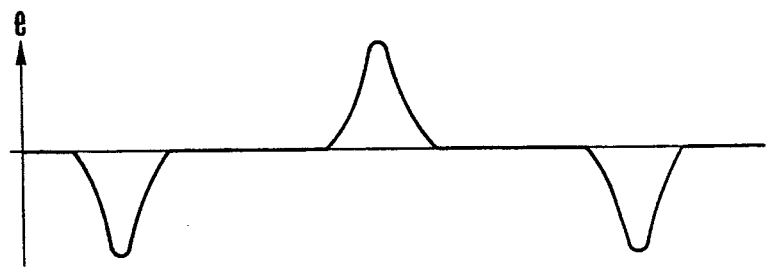
FIG. 14
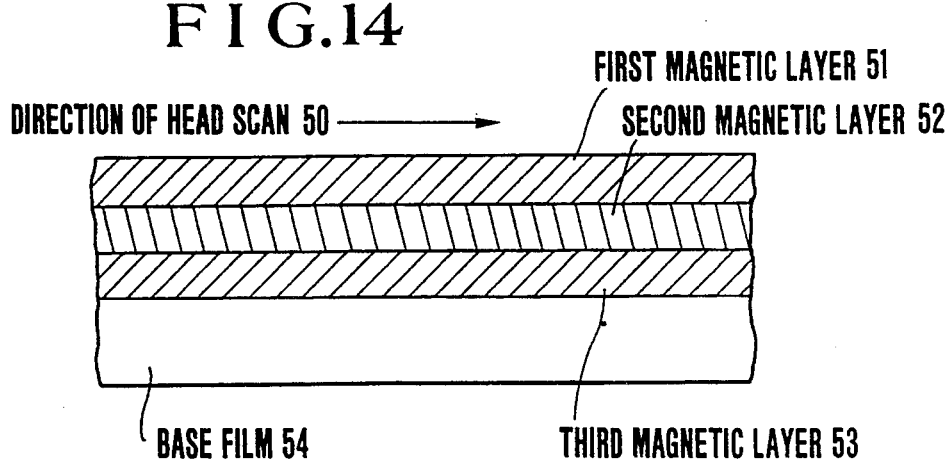

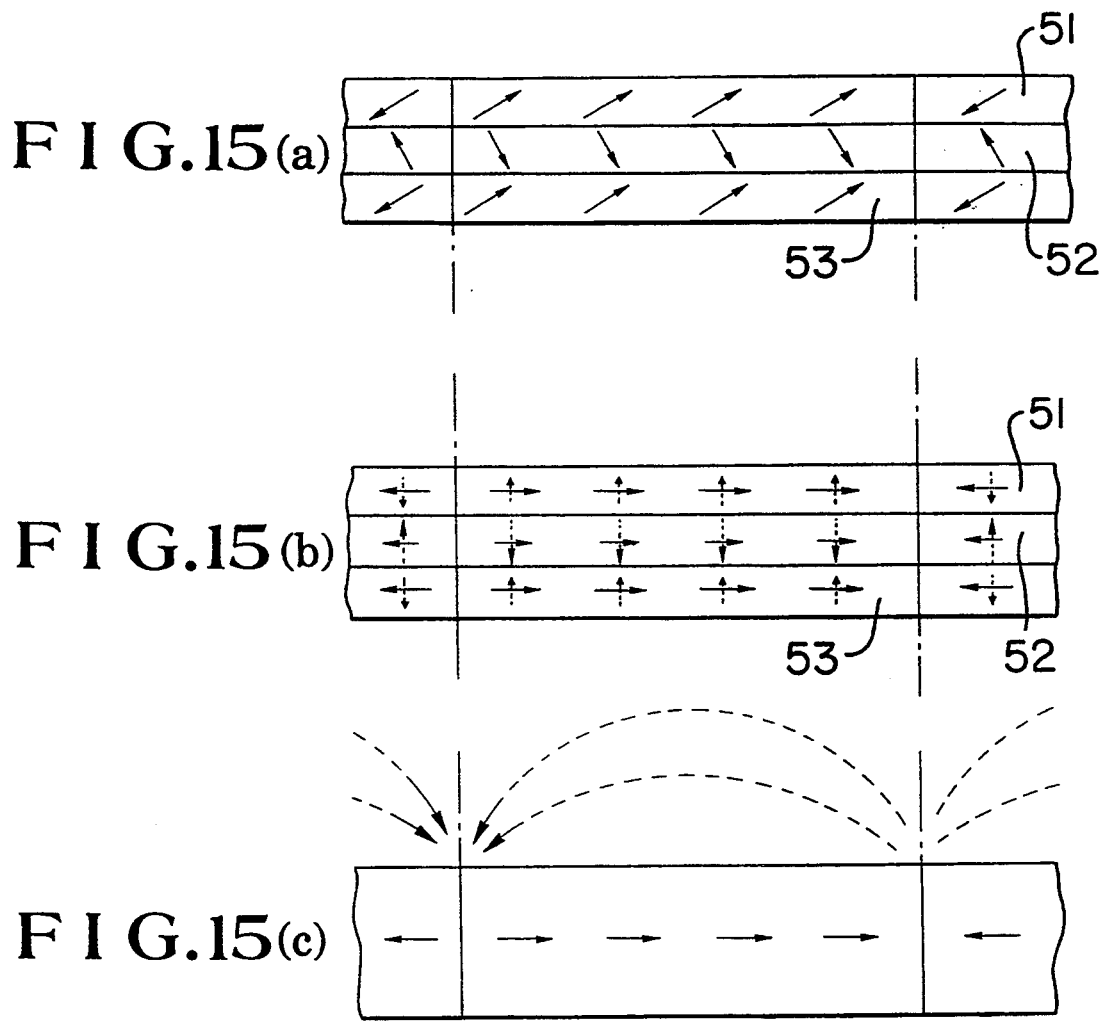
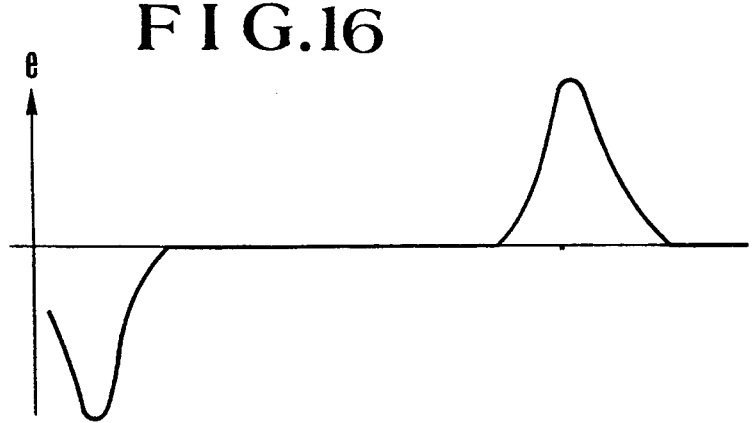

MAGNETIC RECORDING AND REPRODUCING METHOD AND APPARATUS WITH VERTICAL MAGNETIZATION COMPONENT REDUCTION

BACKGROUND OF THE INVENTION

1. Field of the Invention

The present invention relates to a magnetic recording method and a magnetic reproducing method and, more particularly, to a magnetic recording method for effecting high-density magnetic recording of a digital signal as well as to a magnetic reproducing method for reproducing a digital signal which has been magnetically recorded with high density.

2. Description of the Related Art

One known example of an apparatus for carrying out such methods is a digital video tape recorder (VTR) for recording and reproducing a digital video signal.

Typical digital VTRs are required to effect high-density digital recording so that a large amount of data can be handled. To achieve the high-density digital recording, it is an essential requirement to increase the S/N ratio of the magnetic recording system of such a digital VTR.

A tape-shaped magnetic recording medium (hereinafter referred to as the "metal evaporated tape") in which a magnetic layer is formed on a base film by a vapor deposition process, is known as one type of high-density magnetic recording medium. Such a metal evaporated tape is generally superior in its magnetic characteristics, such as residual magnetic flux density, to a metal particle tape and can provide a high-level reproduction output, particularly in a short-wavelength range. For the above and other reasons, the metal evaporated tape promises highly as a medium for high-density magnetic recording, and a medium consisting essentially of Co-Ni has presently been put into practice.

Heretofore, a partial response (1, 0, −1) method is generally employed for digital recording on a metal evaporated tape. This is because a waveform response obtained by recording or reproduction on or from a metal evaporated tape shows a large nonlinear distortion in its low-frequency range compared to that obtained by recording or reproduction on or from a metal particle tape, as will be described later.

In contrast to other methods such as an integration detection method, the partial response (1, 0, −1) method does not need low-frequency compensation and is capable of reducing the influence of the aforesaid low-frequency distortion of the metal evaporated tape. The partial response (1, 0, −1) method is disclosed in "Nakagawa et al, Comparative Examination of Detection Methods in NRZ Recording, Shingakugihou, MR78-3 (Aug., 1978)". Since the partial response (1, 0, −1) method is not directly related to the present invention, a detailed description of the technical contents is omitted.

The partial response (1, 0, −1) method referenced in the above explanation of the conventional example, however, has a number of disadvantages. For example, the timing margin at a signal detection point is small, and since detection of three levels is performed, the optimum value of the threshold level of a comparator at the signal detection point varies due to level variations in reproduction output.

As a result, if high-speed, high-density recording and reproduction are to be realized by utilizing the feature of the metal evaporated tape, i.e., a high S/N ratio, the above-described characteristics of the partial response (1, 0, −1) method will be a great disadvantage, since they increase the instability (jitter, dropout, etc.) of the magnetic recording system to a remarkable extent.

As a technique for reducing the influence of the low-frequency distortion of a metal evaporated tape, it is also considered to use a modulation method, such as $M^2$, 8–14 conversion, to suppress greatly the low-frequency component of a recording signal. However, this method is still undesirable, in that the amount of data to be processed increases greatly and the interval of detection windows is made small.

SUMMARY OF THE INVENTION

It is, therefore, an object of the present invention to solve the above-described problems.

Another object of the present invention is to provide a magnetic recording method and a magnetic reproducing method which are respectively capable of effecting stable magnetic recording and reproduction of good S/N in high-density recording and reproduction of a digital signal.

To achieve the above-described objects, according to one aspect of the present invention, there is provided a magnetic recording method which comprises the steps of converting a digital signal to be recorded into a digital signal having a suppressed low-frequency spectrum and having a shortest recording wavelength greater than half of an original shortest recording wavelength, and recording the converted digital signal on a magnetic recording medium in which a plurality of metal evaporate films, having different crystal-growth directions are laminated.

According to another aspect of the present invention, there is provided a magnetic reproducing method which comprises the steps of reproducing a digital signal from a magnetic recording medium in which a plurality of metal evaporated films having different crystal-growth directions are laminated, performing waveform equalization on the reproduced digital signal, and performing integration detection on the waveform-equalized digital signal to restore an original digital signal.

Still another object of the present invention is to provide a magnetic recording apparatus and a magnetic reproducing apparatus which are respectively capable of effecting stable magnetic recording and reproduction of good S/N in high-density recording and reproduction of a digital signal.

To achieve the above-described object, according to another aspect of the present invention, there is provided a magnetic recording apparatus which comprises inputting means for receiving a digital signal as its input, converting means for converting the digital signal inputted from the inputting means into a digital signal having a suppressed low-frequency spectrum, and recording means for recording the digital signal outputted from the converting means on a magnetic recording medium in which a plurality of metal evaporated films having different crystal-growth directions are laminated.

According to another aspect of the present invention, there is provided a magnetic reproducing apparatus which comprises reproducing means for reproducing a digital signal from a magnetic recording medium in which a plurality of metal evaporated films having different crystal-growth directions are laminated, waveform equalization means for performing waveform equalization on the reproduced digital signal, and integrations detection means for performing integration detection on the waveform-equalized digital signal to restore an original digital signal.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 5(a) and 5(b) are waveform charts respectively showing a magnetic flux density and a reproduction output which are obtainable from the metal particle tape;

FIGS. 8(a), 8(b) and 8(c) are views diagrammatically showing the magnetization patterns of the single-layer metal evaporated tape, respectively;

FIGS. 9(a), 9(b) and 9(c) are waveform charts respectively showing a magnetic flux density and reproduction outputs which are obtainable from the single-layer metal evaporated tape;

FIGS. 12(a), 12(b) and 12(c) are views diagrammatically showing the magnetization patterns of the two-layer metal evaporated tape, respectively;

FIG. 13 is a view showing a reproduction output obtainable from the two-layer metal evaporated tape;

FIG. 14 is a view diagrammatically showing the cross-sectional structure of a three-layer metal evaporated tape according to the embodiment of the present invention;

FIGS. 15(a), 15(b) and 15(c) are views diagrammatically showing the magnetization patterns of the three-layer metal evaporated tape, respectively; and FIGS. 16 is a view showing a reproduction output obtainable from the three-layer metal evaporated tape.

DETAILED DESCRIPTION OF THE PREFERRED EMBODIMENTS

Preferred embodiments of the present invention will be described below with reference to the accompanying drawings.

Figure 1:
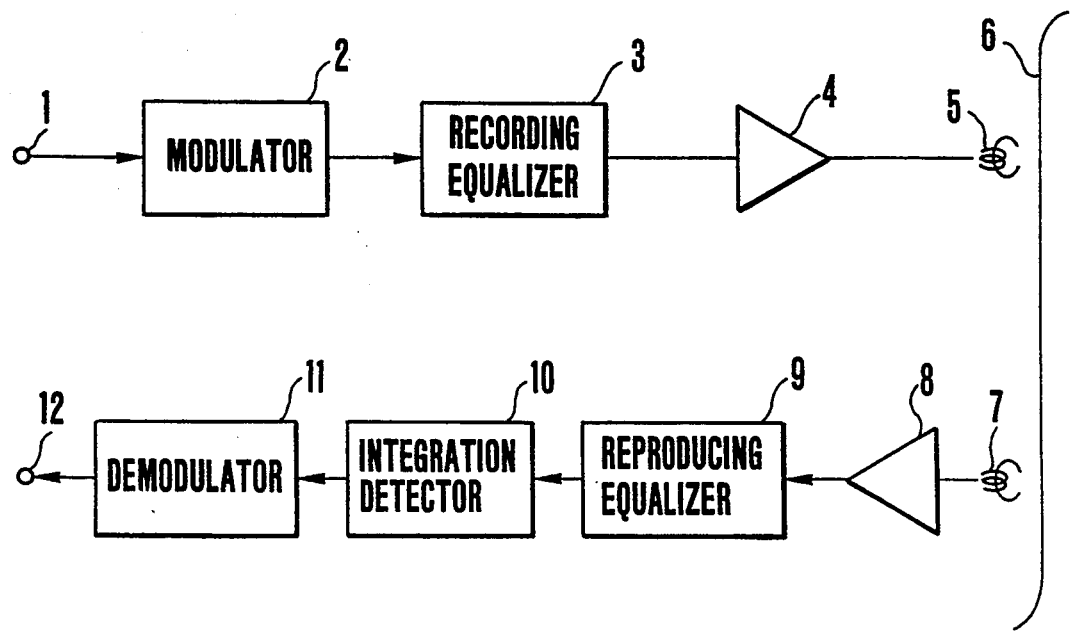
FIG. 1 is a schematic view schematically showing the construction of a magnetic recording and reproducing apparatus according to one embodiment of the present invention.

FIG. 1 is a block diagram schematically showing the construction of a magnetic recording and reproducing apparatus according to one embodiment of the present invention.

Referring to FIG. 1, a digital signal which is inputted at a terminal 1 is modulated into a digital signal having suppressed low frequencies by a modulator 2. The modulation method used in the modulator 2 may be selected from various kinds of methods. A modulation method, such as a scrambled NRZI method, which produces a digital signal containing a relatively large amount of low-frequency component may also be used, but a modulation method which does not provide a signal with extreme redundancy is desirable. In the present invention, a modulation method is used which enables the modulation (conversion) by the modulator 2 to produce a modulated signal of shortest wavelength not less than ½ that of a modulating signal.

The signal thus modulated by the modulator 2 is inputted to a recording equalizer 3, where losses, such as head-core loss, suffered by the signal during recording are compensated for. The signal is written by a ring-shaped magnetic head 5 to a magnetic tape 6 having a multilayer magnetic film via a recording amplifier 4.

During reproduction, a reproduced signal, which is read from the magnetic tape 6 by a ring-shaped magnetic head 7, is amplified by a reproducing amplifier 8, and the differentiation characteristic and high-frequency loss of the signal which have occurred in the magnetic recording system are compensated for by a reproducing equalizer 9. The output of the reproducing equalizer 9 is supplied to an integration detector 10, where the original digital signal is detected by integration. The thus-obtained digital signal is inputted to a demodulator 11, which performs demodulation corresponding to the modulation performed by the modulator 2. The result of the demodulation is outputted through an output terminal 12.

The process in which the present embodiment realizes good digital recording will be described below with specific reference to the waveform response of the magnetic recording system.

Figure 2:
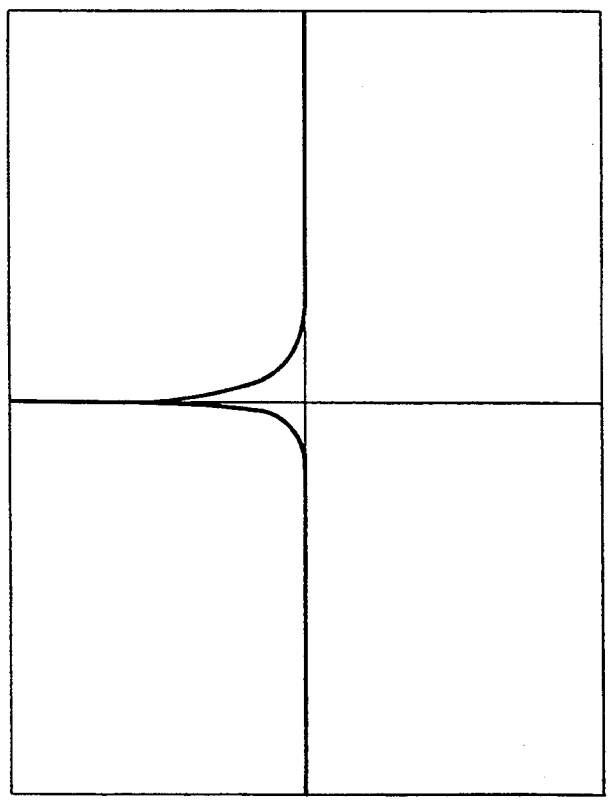
FIG. 2 is a view showing a reproduced isolated waveform representative of the waveform response of a magnetic recording system using a metal particle tape.
Figure 3:
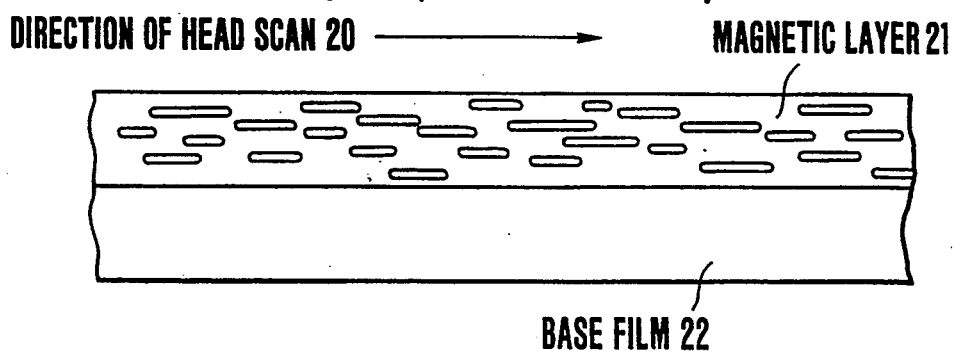
FIG. 3 is a view diagrammatically showing the cross-sectional structure of the metal particle tape.

FIG. 2 is a view showing a reproduced isolated waveform representative of the waveform response of the magnetic recording system using a metal particle tape. FIGS. 3 to 5(a), 5(b) are diagrammatic views used for explaining the waveform response of the metal particle tape of FIG. 2. As shown in FIG. 3, a magnetic layer 21 of the metal particle tape has a structure in which needle-like particles of magnetic material are oriented along the tape length in a plane parallel to the surface of the magnetic tape (magnetic medium), the needle-like particles being applied to a base film 22 by coating using a binder. Accordingly, the easily magnetizable axis coincides with the direction of tape length.

Figure 4:
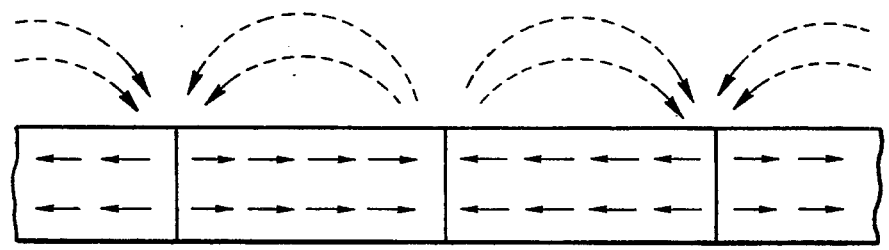
FIG. 4 is a view diagrammatically showing the magnetization patterns of the metal particle tape.
Figure 4:
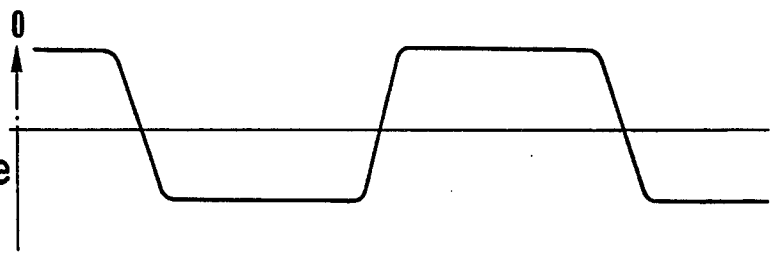

If a rectangular wave of long wavelength is recorded for the purpose of observing a reproduced isolated waveform, the magnetization patterns of the tape are formed as shown in FIG. 4. In FIG. 4, dashed arrows represent leakage magnetic fields from the tape.

Strictly speaking, boundary regions exist between the magnetization patterns and, in such a boundary region, the magnetization is directed toward the tape surface to form a kind of reflux magnetic domain which allows magnetic fields to escape through the tape surface. Since the boundary regions are not directly related to the present invention, they are not shown in FIG. 4.

If the ring-shaped head 5 is made to slide on the magnetic tape 6 in the direction of an arrow 20 indicative of the direction of head scan, magnetic flux density $\phi$ is induced in the head core by the leakage magnetic fields from the magnetic tape 6. The state obtained at this time is shown in FIG. 5(a). In FIG. 5(a), the inclined portions of the waveform correspond to the respective transition regions between the aforesaid magnetization patterns.

Figure 5B:
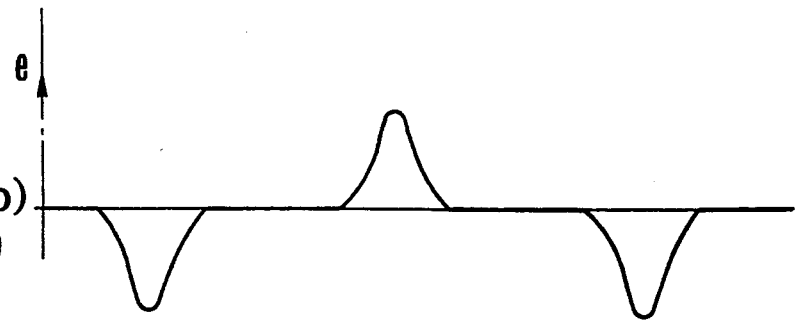

The change (d$\phi$/dt), shown in FIG. 5(a), of the magnetic flux density $\phi$ with time is provided at the coil end of the head 5 as the reproduction output e shown in FIG. 5(b). The result obtained by actually measuring the isolated waveform of FIG. 5(b) is shown in FIG. 2. As can be seen from FIG. 2, although a little phase delay is observed, an isolated waveform which is approximately symmetrical in the direction of the time axis is obtained. Accordingly, integration detection can be performed by using a linear reproducing equalizer.

Figure 6:
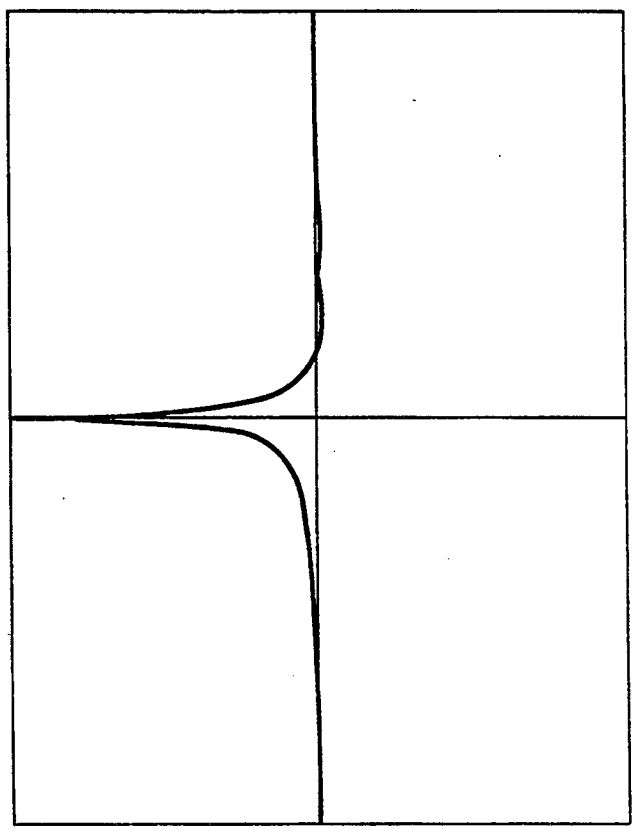
FIG. 6 is a view showing a reproduced isolated waveform representative of the waveform response of the magnetic recording system using a single-layer metal evaporated tape.

FIG. 6 is a view showing a reproduced isolated waveform representative of the waveform response of the magnetic recording system using a conventional metal evaporated tape. As shown, the reproduced isolated waveform is asymmetrical in the direction of the time axis and a large nonlinear distortion is observed in a low-frequency range.

The occurrence of the nonlinear distortion is due to the magnetization patterns of the metal evaporated tape itself. The occurrence of the nonlinear distortion is described below with reference to FIGS. 7 to 9(a), 9(b), 9(c).

Figure 7:
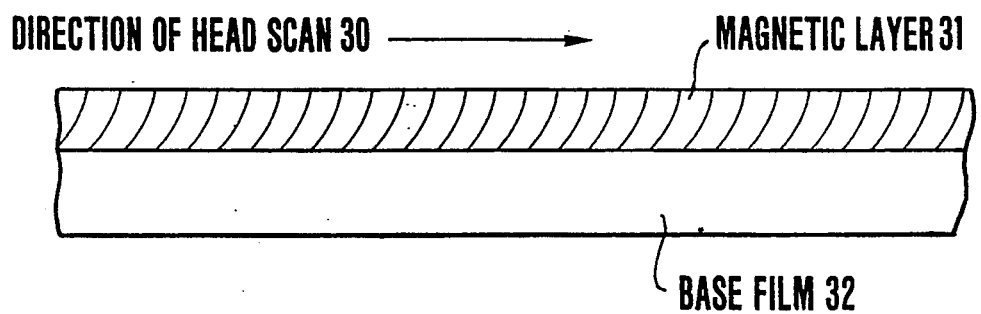
FIG. 7 is a view diagrammatically showing the cross-sectional structure of the single-layer metal evaporated tape.

As shown diagrammatically in FIG. 7, in general, a metal evaporated tape has a magnetic layer 31 consisting of a magnetic film having a columnar structure which obliquely grows on a base film 32. The easily magnetizable axis of the magnetic layer 31 inclines by a small degree from its crystal-growth direction of the columnar structure toward a plane parallel to the medium surface. This inclination is due to the influence of the shape magnetic anisotropy of the magnetic film.

FIG. 8(a) shows the magnetization patterns obtained when a rectangular wave of long wavelength is recorded on a metal evaporated tape having the aforesaid film structure. As shown, all magnetization is directed in the respective directions of the easily magnetizable axis which is inclined by a small degree, and leakage magnetic fields occur slightly obliquely according to the inclination of the magnetization. In the following description, each of the magnetization patterns and leakage magnetic fields which are inclined by a small degree is decomposed into a component appearing in the direction of tape length (hereinafter called "horizontal (direction)") and a component appearing in the direction normal to the tape surface (hereinafter called "vertical (direction)"), and consideration is given to the horizontal and vertical components.

The horizontal components and the vertical components are shown in FIGS. 8(b) and 8(c), respectively.

FIG. 9(a) shows the magnetic flux density $\phi$ induced in the head core when the head scans the tape surface, on the basis of the magnetization shown in FIG. 8(a). In FIG. 9(a), the solid line represents the magnetic flux density induced by the horizontal components, while the dashed line presents the magnetic flux density induced by the vertical components.

Normally, the angle which the easily magnetizable axis makes with the horizontal direction is on the order of 20°–30°, and in the magnetization the vertical components are small compared to the horizontal components. As can be seen from FIG. 8(c), the imaginary magnetic poles of the vertical components are widely distributed.

Accordingly, in FIG. 9(a), the magnetic flux density due to the vertical components is smaller and broader than that due to the horizontal components FIG. 9(b) shows the reproduction outputs e which are respectively obtained from a change with time in the magnetic flux density due to the horizontal components and from a change with time in the magnetic flux density due to the vertical components. In FIG. 9(b), each solid line represents a reproduction output derived from the horizontal components, while each dashed line represents a reproduction output derived from the vertical components. The solid line has a form similar to that shown in FIG. 5(b), and, finally, a reproduced output waveform consisting of a combination of the two kinds of components is obtained, as shown in FIG. 9(c).

As described above, the distortion which is observed in the low-frequency range as shown in FIG. 6 is the nonlinear distortion due to the presence of the vertical components of the magnetization patterns of the metal evaporated tape, and it is difficult to compensate for such a distortion by means of a linear reproducing equalizer. Accordingly, in digital recording for conventional metal evaporated tapes, to avoid the distortion in the low-frequency range, the partial response (1, 0, −1) method, which does not need compensation for low-frequency components, is employed.

However, as described previously, the partial response (1, 0, −1) method has a characteristic out of favor of the instability of magnetic recording.

Figure 11:
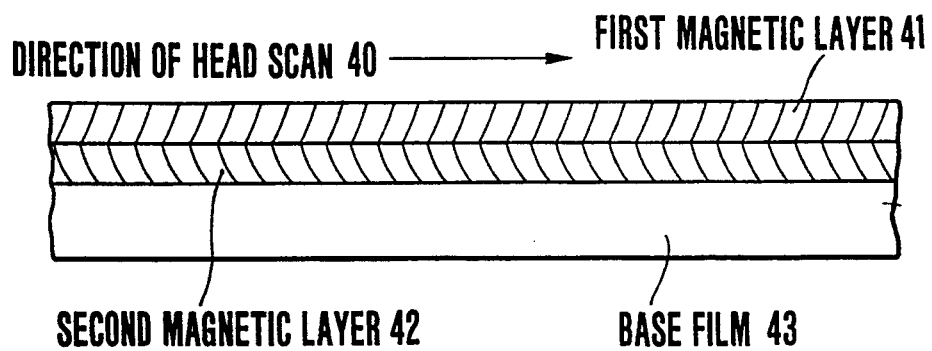
FIG. 11 is a view diagrammatically showing the cross-sectional structure of the two-layer metal evaporated tape.

FIG. 11 shows the structure of a metal evaporated tape used in the present embodiment.

The magnetic layer of the shown metal evaporated tape consists of a metal evaporated film of two layers (a first magnetic layer 41 and a second magnetic layer 42), and the crystal-growth directions of the columnar structure in the respective layers differ from each other. The crystal-growth directions are approximately symmetrical with respect to a plane normal to the direction of the tape length and, therefore, the angles which the crystal-growth direction and the easily magnetizable axis of one of the layers make with a plane parallel to the medium surface are approximately equal to the angles which the corresponding directions of the other layer make with such a plane. The total thickness of the magnetic layer consisting of the two layers is approximately equal to the thickness of the magnetic layer of the conventional metal evaporated tape shown in FIG. 7.

FIG. 12(a) shows the magnetization patterns obtained when a rectangular wave of long wavelength is recorded on the metal evaporated tape shown in FIG. 11. The direction of magnetization of each of the layers substantially coincides with the easily magnetizable axis in each of the layers. If each of the magnetization patterns is decomposed into a horizontal component and a vertical component as shown in FIG. 12(b), the vertical components of the respective layers cancel each other. Accordingly, macroscopically, only the horizontal components are externally observed, as shown in FIG. 12(c). The reproduced output waveform obtained at this time is shown in FIG. 13.

Figure 10:
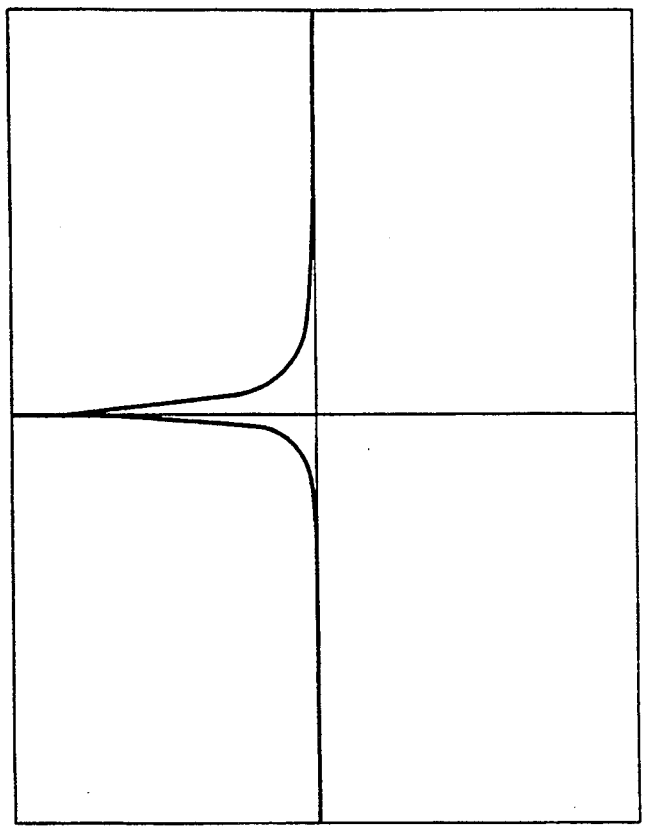
FIG. 10 is a view showing a reproduced isolated waveform representative of the waveform response of the magnetic recording system using a two-layer metal evaporated tape according to the embodiment of the present invention.

The actual reproduced isolated waveform of FIG. 10 greatly differs from the isolated waveform of the conventional metal evaporated tape of FIG. 6, and is close to the isolated waveform of the metal particle tape of FIG. 2.

Accordingly, it is possible to perform normal integration detection using the linear reproducing equalizer 9 as shown in FIG. 1, whereby it is possible to perform high-density recording insusceptible to the instability (jitter, dropout, etc.) of the magnetic recording system.

The above description of the embodiment refers to the case where a metal evaporated tape having a metal evaporated film of two layers is used. However, the number of layers is not limited to two and any number of layers not less than two layers may be used.

From the foregoing description, it will be readily perceived that, in the case of an even number of magnetic layers, if the crystal-growth directions in adjacent ones of the magnetic layers are made symmetrical with respect to a plane normal to the direction of tape length, the vertical components of the magnetization of the respective adjacent layers cancel each other to allow only the horizontal components to be observed externally.

The following is a description of an odd number of magnetic layers, for example, a three-layer magnetic film. FIG. 14 is a view diagrammatically showing a metal evaporated tape having a magnetic film of three layers.

The magnetic film of the metal evaporated tape consists of a metal evaporated film of three layers, each having a different crystal-growth direction. It is assumed that, of the three layers, a first magnetic layer 51, a second magnetic layer 52 and a third magnetic layer 53 are formed in that order from the tape surface.

If the crystal-growth direction in each of the layers is noted, it is found that the crystal-growth direction in the second magnetic layer 52 is closer to the vertical direction relative to the medium surface than is the crystal-growth direction in each of the first and third magnetic layers 51 and 53. Accordingly, as shown in FIG. 15(a), the direction of magnetization of only the second layer 52 is a little closer to the vertical direction.

If each of the magnetization patterns of FIG. 15(a) is decomposed into a horizontal component and a vertical component, the result shown in FIG. 15(b) is obtained. The state shown in FIG. 15(b) is intended to make the vertical magnetization components of the three layers zero in total. Accordingly, as shown in FIG. 15(c), only the horizontal magnetization components can be externally observed. In consequence, it is possible to obtain a reproduced isolated waveform which resembles that of the metal particle tape and is free from low-frequency nonlinear distortion, as shown in FIG. 16.

Further, as is apparent from the foregoing description, the feature of the magnetic recording medium according to the embodiment of the present invention geometrically depends on the crystal-growth direction in each magnetic layer formed by vapor deposition, and does not depend on the composition of the magnetic film. Accordingly, if the present invention is applied to a metal evaporated film medium consisting essentially of, for example, Co-Cr, it is possible to achieve similar advantages.

As is apparent from the foregoing description, according to the magnetic recording method and the magnetic reproducing method according to the present invention, each of magnetic layers which are laminated cancels the magnetization components of the adjacent magnetic layer which act in the vertical direction relative to the surface of the magnetic recording medium, whereby it is possible to reduce the deterioration of a recording signal due to the presence of the vertical magnetization components. Accordingly, a digital signal passed through various processes of recording and reproduction can be restored with high stability and with good S/N.

What is claimed is:

1. A magnetic recording method comprising the steps of:
   converting a digital signal to be recorded into a digital signal having a suppressed low-frequency spectrum and having a shortest recording wavelength greater than half an original shortest recording wavelength; and
   recording the converted digital signal on a magnetic recording medium in which a plurality of metal evaporated films having different crystal-growth directions are laminated, wherein magnetization components of the plurality of metal evaporated films of said magnetic recording medium in a vertical direction to a surface thereof are substantially zero in total.

2. A method according to claim 1, wherein the plurality of metal evaporated films are an even number of metal evaporated films, crystal-growth directions in adjacent ones of the metal evaporated films being opposite to each other with respect to a surface of the magnetic recording medium and making substantially the same angle with respect to the surface of the magnetic recording medium.

3. A method according to claim 1, wherein the plurality of metal evaporated films are an odd number of metal evaporated films which are not less than three metal evaporated films, crystal-growth directions in adjacent ones of the metal evaporated films being opposite to each other with respect to a surface of the magnetic recording medium, and an angle which a crystal-growth direction in an odd-numbered metal evaporated film makes with the surface of the magnetic recording medium being smaller than an angle which a crystal-growth direction in an even-numbered metal evaporated film makes with the surface of the magnetic recording medium.

4. A magnetic reproducing method comprising the steps of:
   reproducing a digital signal from a magnetic recording medium in which a plurality of metal evaporated films having different crystal-growth directions are laminated, wherein magnetization components of the plurality of metal evaporated films of said magnetic recording medium in a vertical direction relative to a surface thereof are substantially zero in total;
   performing waveform equalization on the reproduced digital signal; and
   performing integration detection on the waveform-equalized digital signal to restore an original digital signal.

5. A method according to claim 4, wherein the plurality of metal evaporated films are an even number of metal evaporated films, crystal-growth directions in adjacent ones of the metal evaporated films being opposite to each other with respect to a surface of the magnetic recording medium and making substantially the same angle with respect to the surface of the magnetic recording medium.

6. A method according to claim 4, wherein the plurality of metal evaporated films are an odd number of metal evaporated films which are not less than three metal evaporated films, crystal-growth directions in adjacent ones of the metal evaporated films being opposite to each other with respect to a surface of the magnetic recording medium, and an angle which a crystal-growth direction in an odd-numbered metal evaporated film makes with the surface of the magnetic recording medium being smaller than an angle which a crystal-growth direction in an even-numbered metal evaporated film makes with the surface of the magnetic recording medium.

7. A magnetic recording and reproducing method comprising the steps of:

converting a digital signal to be recorded into a digital signal having a suppressed low-frequency spectrum;

recording the converted digital signal on a magnetic recording medium in which a plurality of metal evaporated films having different crystal-growth directions are laminated, wherein magnetization components of the plurality of metal evaporated films of said magnetic recording medium in a vertical direction relative to a surface thereof are substantially zero in total;

reproducing the digital signal from the magnetic recording medium;

performing waveform equalization on the reproduced digital signal; and performing integration detection on the waveform-equalized digital signal to restore an original digital signal.

8. A magnetic recording apparatus comprising:

(a) inputting means for receiving a digital signal as its input;

(b) converting means for converting the digital signal inputted from said inputting means into a digital signal having a suppressed low-frequency spectrum; and (c) recording means for recording the digital signal outputted from said converting means on a magnetic recording medium in which a plurality of metal evaporated films having different crystal-growth directions are laminated, wherein magnetization components of the plurality of metal evaporated films of said magnetic recording medium in a vertical direction relative to a surface thereof are substantially zero in total.

9. A magnetic reproducing apparatus comprising:

(a) reproducing means for reproducing a digital signal from a magnetic recording medium in which a plurality of metal evaporated films having different crystal-growth directions are laminated, wherein magnetization components of the plurality of metal evaporated films of said magnetic recording medium in a vertical direction relative to a surface thereof are substantially zero in total;

(b) waveform equalization means for performing waveform equalization on the reproduced digital signal; and (c) integration detection means for performing integration detection on the waveform-equalized digital signal to restore an original digital signal.

10. A magnetic recording and reproducing apparatus comprising:

(a) inputting means for receiving a digital signal as its input;

(b) converting means for converting the digital signal inputted from said inputting means into a digital signal having a suppressed low-frequency spectrum;

(c) recording means for recording the digital signal outputted from said converting means on a magnetic recording medium in which a plurality of metal evaporated films having different crystal-growth directions are laminated, wherein magnetization components of the plurality of metal evaporated films of said magnetic recording medium in a vertical direction relative to a surface thereof are substantially zero in total;

(d) reproducing means for reproducing the digital signal from the magnetic recording medium;

(e) waveform equalization means for performing waveform equalization on the reproduced digital signal; and (f) integration detection means for performing integration detection on the waveform-equalized digital signal to restore an original digital signal.

* * * * *

UNITED STATES PATENT AND TRADEMARK OFFICE
CERTIFICATE OF CORRECTION

PATENT NO. : 5,347,408

DATED : September 13, 1994

INVENTOR(S) : Makoto Gohda et al.

It is certified that error appears in the above-identified patent and that said Letters Patent is hereby corrected as shown below:

Col. 1, line 35. After "promises" insert -- to be -- and after "highly" insert -- effective --.

Col. 2, line 33. Change "evaporate" to -- evaporated --.

Col. 3, lines 1-2. Change "integrations" to -- integration --.

Col. 6, line 33. Change "of" to -- with --.

Col. 8, line 21. After "direction" insert -- relative --.

Signed and Sealed this

Seventh Day of February, 1995

Attest:

BRUCE LEHMAN

*Attesting Officer*     *Commissioner of Patents and Trademarks*